United States Patent [19]

Marcella

[11] Patent Number: 5,642,094
[45] Date of Patent: Jun. 24, 1997

[54] TYPE-OF-STOP EXPECTATION WARNING

[76] Inventor: Frank Marcella, 13 Stanley St., Pleasantville, N.Y. 10570

[21] Appl. No.: 500,663

[22] Filed: Jul. 11, 1995

[51] Int. Cl.$^6$ .................................................. B60Q 1/44
[52] U.S. Cl. .......................... 340/479; 340/468; 340/463; 340/464
[58] Field of Search .............................. 340/479, 475, 340/471, 468, 464, 463, 467

[56] References Cited

U.S. PATENT DOCUMENTS

| | | | |
|---|---|---|---|
| 3,109,158 | 10/1963 | Coombs | 340/464 |
| 3,364,384 | 1/1968 | Dankert | 340/464 |
| 3,492,638 | 1/1970 | Lane | 340/464 |
| 4,916,431 | 4/1990 | Geary | 340/464 |

Primary Examiner—Jeffery Hofsass
Assistant Examiner—Julie B. Lieu
Attorney, Agent, or Firm—Lackenbach Siegel Marzullo Aronson & Greenspan, P.C.

[57] ABSTRACT

Braking expectation control, based upon manual selection by the driver of the vehicle plus automatic activation (including override of the manual selection) operates to give the following motorist information concerning the type-of-stop. Blinking yellow lights warn of an easy slowdown such as occurs when coasting with the accelerator free. Red stop warning lights burn brightly for a standard stop, as is the case for currently manufactured vehicles. For the panicstop, however, all rear lights come on—red brakelights, red or yellow turn signals together as hazard warnings, hazard lights if separate from the turn signal lights, backup lights—followed by blinking yellow for a continuing warning. The automatic control takes sensor inputs for accelerator-free, foot-on-brake, brake pressure at two levels, stop and panicstop, and includes a timer to determine whether the brake activity is a tap or a more serious stop or panicstop.

6 Claims, 1 Drawing Sheet

TYPE-OF-STOP EXPECTATION WARNING

BACKGROUND OF THE INVENTION

1. Field of the Invention

This invention relates to automotive signal devices, and more particularly relates to a deceleration expectation warning controller and associated signal lights for signaling various levels of stopping expectation, from temporary slowdown due to a tap on the brake, or slowdown from coasting through ordinary stopping, to standard stopping, to panic stopping.

2. Description of the Related Art

Brakelight signals to indicate a stopping operation have been included in automobiles almost since the advent of electric lighting. A signal control switch activated by depression of the brake pedal (later by sensing the buildup of hydraulic pressure, or air pressure, in the braking system) controlled a bright taillight (later two or three taillights) to turn on a set of stop-warning taillights, or cause the existing lighted running taillight set to glow more brightly.

Next came hazard warning flashers, which, as popularly deployed, signal by flashing the full set of taillights (or special hazard warning lights) as if both a right turn and a left turn were simultaneously to be expected, and thus to signal a hazard ahead.

One other set of rear lights appears on most modern vehicles—backup lights. Automatic from the placement of the gearshift lever into reverse, such lights not only provide light to see by, but also provide an indication of expectation to reverse. Most large trucks supplement or supplant the backup light by a backup warning gong.

Turn signals have been popularly mounted on automobiles and trucks since the late-thirties Buick popularized the practice of manually selecting a signal of an intent to turn, which activated an arrow light, and later activated such things as the pop-up semaphore on the early VW and the current blinking turn signal of red or yellow light. The turn signal not only signals an intent to turn—but also gives the important information of WHAT TO EXPECT (right turn? or left turn?).

An automotive aftermarket device, sold mostly as a novelty item, was a miniature traffic signal light for mounting in the rear window of a car. Red, yellow and green lights in the miniature traffic signal were connected in a simple pattern in which the red light mimicked the brake warning signal lights and the green and yellow lights glowed in parallel with the headlights.

Prior to this invention, however, there has been no additional information (EXPECTATION INFORMATION) added to the intent-to-stop information passed by the brakelight. The first following motorist may be dangerously misled by a brakelight signal resulting from a light touch on the brake, sufficient to activate the brakelight by insufficient to accomplish any significant deceleration. To the first following motorist, that brakelight may be interpreted as a command to stop! The EXPECTATION INFORMATION is reasonable, but faulty! If the first following motorist reacts by a panicstop, that panicstop may trigger a multiple rear-end collision! If the second following and subsequent following motorists cannot stop in time—even though in fact there never was need for the first following motorist to stop—they may crash in turn into the rear of the respectively preceding vehicles.

The problem is that the binary (off/on) brakelight signal in fact is ambiguous. This ambiguous brakelight warns of a stop, regardless of whether the expectation is an actual stop (a panicstop or a gentle stop) or simply a slowdown, or even a light, continuing touch by the preceding car driver's foot lightly resting on the brake pedal.

SUMMARY OF THE INVENTION

The invention provides a simple manual control, with overriding automatic backup control, for a type-of-stop expectation signal to replace the presently-ambiguous brakelight signal.

It is an object of the invention to provide a manual, wand-controlled rear-warning of type-of-stop, with automatic overriding backup of type-of-stop, from gentle slowdown through regular stopping to panicstop.

A feature of the invention is a running control and pressure sensor which provides type-of-stop information to the type-of-stop signal control.

Another feature of the invention is the deployment of a front-dip sensor, an acceleration/deceleration sensor, an accelerator pedal depression sensor, a brake pedal foot contact sensor, and an elapsed time clocking device, from which input composite the automatic control can supplement the input of the more standard braking system pressure threshold sensor to determine the stopping expectation and thus to control the stopping expectation signalling light set for a type-of-stop warning.

An advantage of the invention is that the following motorist will not be falsely warned to make an unsafe stop when only a slowdown is appropriate, and thus to guard against possibly resulting multi-vehicle rear-end crashes.

Other objects, features and advantages will be apparent to all experienced drivers, who welcome the opportunity to signal their stopping expectations, and who welcome such stopping expectation signals from preceding motorists.

DRAWINGS

DESCRIPTION OF A PREFERRED EMBODIMENT

Figure 1:
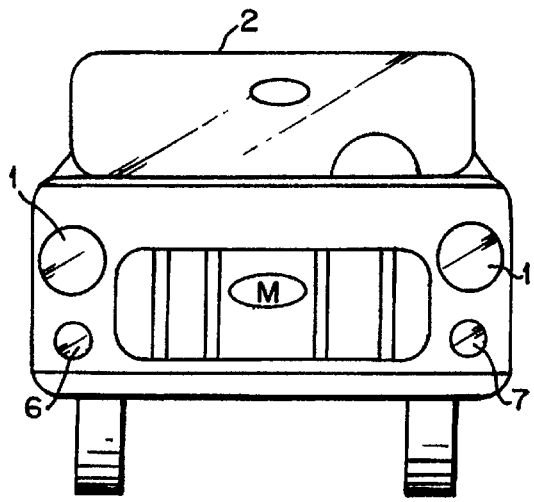
FIG. 1 shows the front signal lamps of a car.
Figure 2:
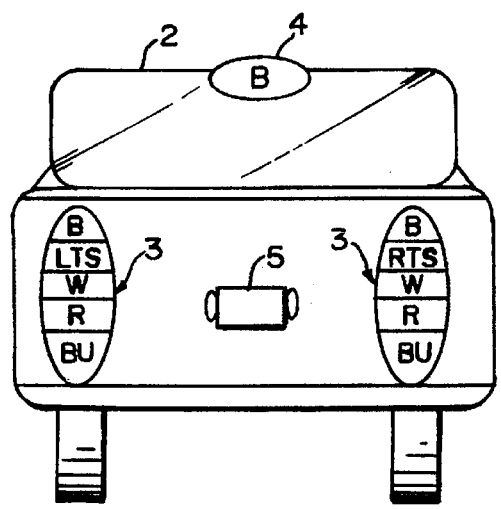
FIG. 2 shows the rear signal lamps of a car equipped specially for type-of-stop expectation signaling according to the invention.
Figure 3:
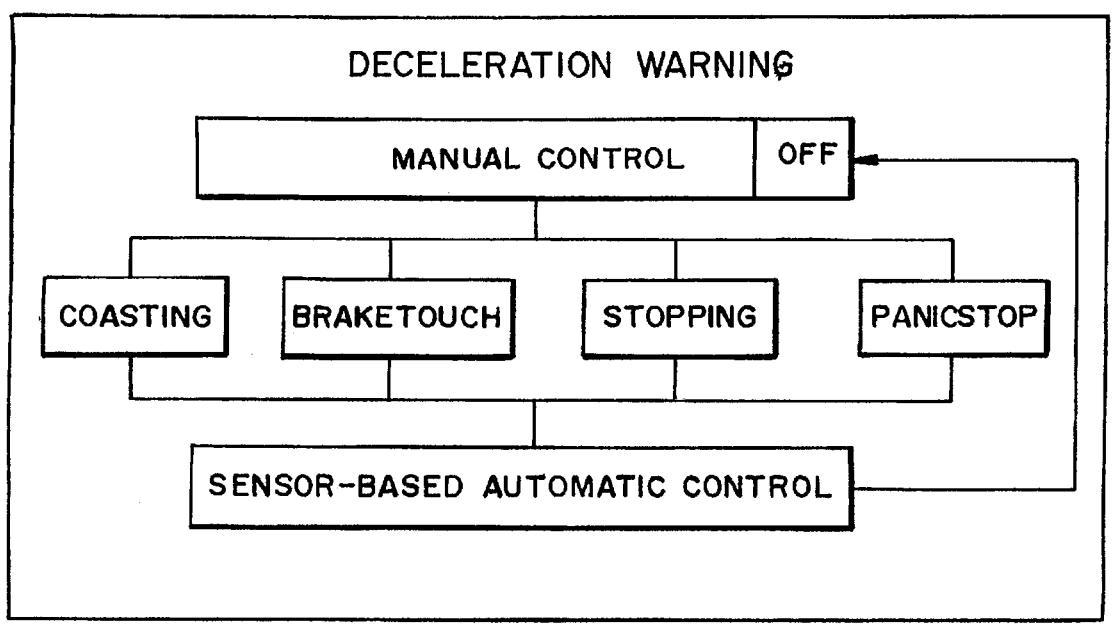
FIG. 3 is a chart showing the signal controls for type-of-stop expectation warning.

FIGS. 1–3 show the car equipped for type-of-stop expectation warning signaling according to the invention. The headlights 1 of car 2 normally are non-signaling but in modern US driving are normally "on" when the car is running. Taillights 3 normally have the running taillight 3-R "on" when the car is running. The other lights included in taillights 3 are turn signal lights 3-LTS and 3-RTS, now usually yellow but sometimes red, respectively to signal the expectation of left turn and right turn. Lights 3-B and 4-B are bright, usually red but sometimes yellow, brake warning lights. Lights 3-W are for braking expectation signalling. Lights 3-R are running taillights, almost universally red and of medium brightness. Lights 3-BU are white back-up lights, almost universally white. (Note that there is not a universal convention for red, yellow and white rear warning lights. Note also that a taillight lens may be broken, and the result is a white light.) Brake warning light 4 is a red stop warning light, working in conjunction with taillights 3W. Rear license plate 5 is almost universally equipped with white lights during night running, and in the coming convention of daytime running lights will probably be always "on" when the vehicle is running. In FIG. 1, parking lights 6 and 7 may serve as running lights and also as turn signals—plus brake expectation signals in the embodiments of this invention. Parking lights 6 and 7 may be replicated for styling and for better warning capability, but warning ahead of stopping expectations is not a major requirement.

There are some things other than hydraulic brake pressure which may indicate a stop or panic stop. Front-end-dip usually accompanies a stop. Brake pedal travel, even in the absence of hydraulic pressure build-up, should be sensed in vehicles with manual brakes, air brakes, electric brakes or otherwise without hydraulic brakes. Parking brake travel (hand or foot emergency brakes) and automatic braking, common in big trucks as a safety against a loss of braking air pressure, should be appropriately sensed. Deployment of an air bag should be appropriately sensed. In short, anything demanding a panicstop or a regular stop, or anything commonly associated with a panicstop or a regular stop or slowing, should be appropriately sensed and fed to the braking expectation sensor-based automatic control.

The following is a chart which shows stopping expectation warnings according to a preferred embodiment:

end-dip, braking system pressure and elapsed-time, in composite capable of detecting accelerator-free, brake tap, footrest on brake pedal, standard braking, and panicstop braking are present as a supplement to manual braking expectation selection means to select among a variety of braking expectation warnings, by means of a sensor-based automatic type-of-stop warning control means, responsive to said manual braking expectation selection means and to said sensing means, for controlling a plurality of braking expectation signals of rear lighting differing for different type-of-stop expectations.

Embodiment may be by a set of relays or by solid state electronics or computer control, using electronic logic to concatenate sensor signals in accordance with the type-of-stop expectation warning protocols in the chart, considering the lighting controls and wiring of the vehicle. The result is a warning system which may be controlled manually, much as emergency flashers and turn signals are controlled—but with automatic override to signal the actual type-of-stop regardless of manual setting. While the protocols have been described in terms of red, yellow and white lights, actual colors and combinations may be changed as warning signal conventions develop—so long as the result is a signal set which warns of type-of-stop expectation as early as conditions permit.

| COASTING | TAP--BRAKE | FOOT RESTS ON BRAKE | STANDARD BRAKING | PANIC STOP BRAKING |
|---|---|---|---|---|
| CONTINUOUS BLINKING YELLOW (REAR & FRONT) | RED BLINK (REAR) & THREE BLINKS OF YELLOW (FRONT & REAR) | RED BLINK (REAR) & CONTINUOUS BLINKS OF YELLOW (FRONT & REAR) | RED (REAR) & CONTINUOUS BLINKS OF YELLOW (FRONT & REAR) | ALL REAR LIGHTS ON FULL -- RED, YELLOW & WHITE (REAR) WITH FOLLOWING TIMED BLINKS OF YELLOW (FRONT & REAR) |
| ACCELERATOR FREE | BRAKE TAP / ACCELERATOR FREE | FOOT RESTS ON BRAKE | HEAVY BRAKE PRESSURE | VERY HEAVY BRAKE PRESSURE |
| NO FRONT-END-DIP | MINIMUM SHORT-TERM FRONT-END-DIP | NO FRONT-END-DIP | SOME FRONT-END-DIP | DEEP FRONT-END-DIP |
| | | | | ** AIRBAG DEPLOYMENT |

NOTE that the automatic control of the braking expectation signals overrides the manual. The following motorist is much more interested in what is actually happening than in what the preceding driver may intend or expect. For example, the vehicle reaction to a panicstop is much less ambiguous than the driver's expectation. The combination of very high braking system pressure and a front-end-dip unambiguously determine that a panic stop is happening—regardless of driver expectation. Airbag deployment, whatever the cause, is reason to signal a panicstop, regardless of other parameters.—as indicated in the asterisks in the chart. Sensing means for determining automatically a variety of stop-inferring occurrences including accelerator-free, front-

I claim:

1. A type-of-stop deceleration expectation warning system, for a vehicle equipped with a plurality of signal warning lights including brake warning taillights and other rear lights, comprising:

a) manual braking-expectation-selection means to select among a variety of braking expectation warnings;

b) sensing means for determining automatically a variety of stop-inferring occurrences including accelerator-free front-end-dip, braking system and elapsed-time, in composite capable of detecting accelerator-free, brake tap, foot-on-brake, standard braking, and panicstop braking; and c) sensor-based automatic type-of-stop warning control means responsive to said manual braking expectation selection means and to said sensing means, for controlling a plurality of braking expectation signals involving a set of patterns of rear lighting differing for different type-of-stop expectations.

2. A type-of-stop deceleration expectation warning system according to claim 1, wherein said sensor-based automatic type-of-stop warning control means includes automatic override of said manual braking-expectation-selection means by said control means.

3. A type-of-stop deceleration expectation warning system according to claim 1, wherein said sensing means, in concert with said sensor-based automatic type-of-stop warning control means includes means, to determine a plurality of braking system activity values, including short-duration light pressure defining a tap; heavy pressure defining a standard stop; and very heavy pressure defining a panicstop.

4. A type-of-stop deceleration expectation warning system according to claim 1, in which said sensing means includes foot-on-pedal sensing in addition to brake system pressure sensing.

5. A type-of-stop deceleration expectation warning system according to claim 2, wherein panicstop is signaled by lighting all rear lights, with brake lights full on, hazard warning signals flashing, and other lights active.

6. A type-of-stop deceleration expectation warning system according to claim 1, wherein said control means also controls the front warning signals in a pattern appropriate for the type-of-stop.

* * * * *